April 28, 1925.
J. J. GALLARDO
INFUSION EXTRACTOR
Filed Aug. 16, 1924
1,535,769
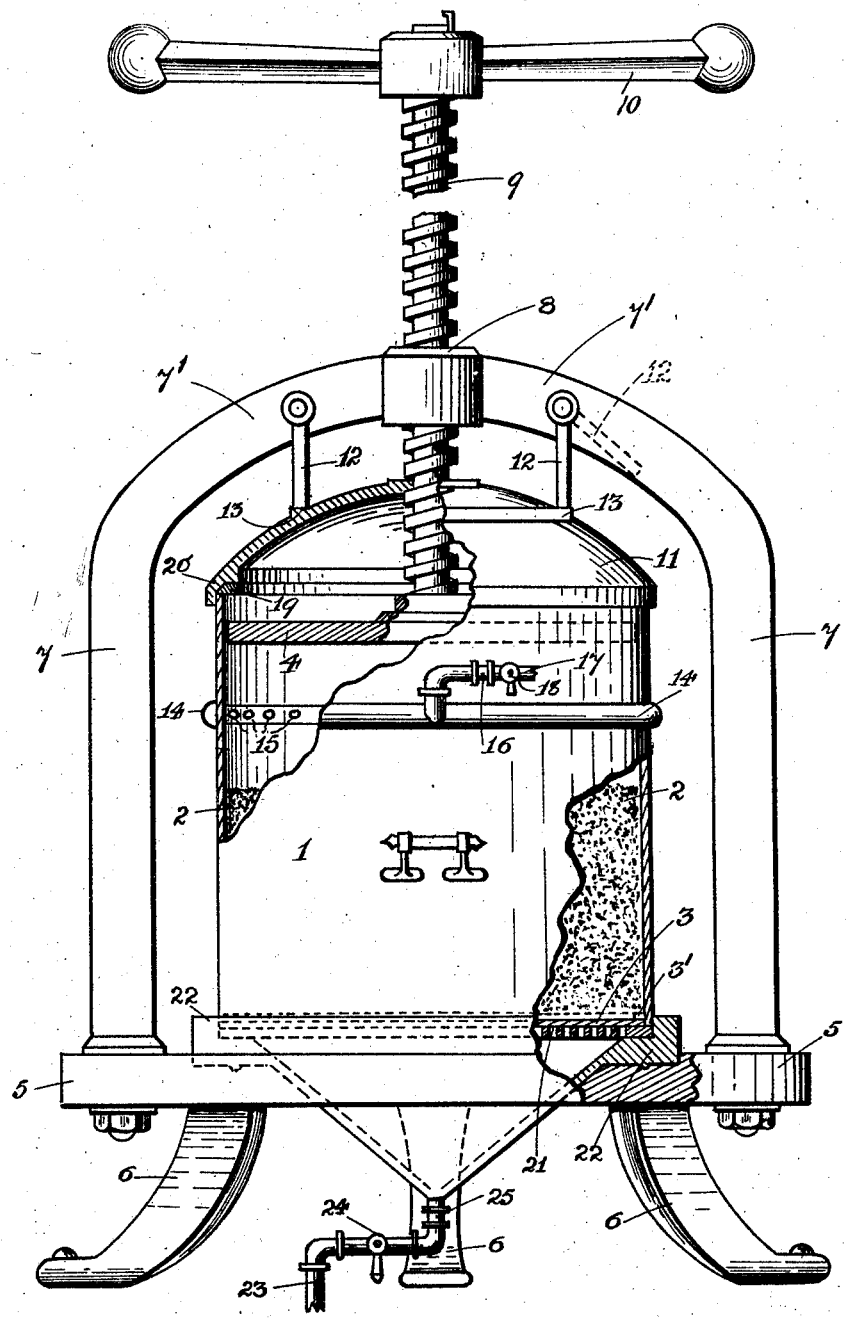
by J. J. Gallardo, Inventor.
Attorney.

Patented Apr. 28, 1925.

1,535,769

UNITED STATES PATENT OFFICE.

JOSEPH JOACHIM GALLARDO, OF SAN TECLA, SALVADOR.

INFUSION EXTRACTOR.

Application filed August 16, 1924. Serial No. 732,533.

*To all whom it may concern:*

Be it known that I, JOSEPH JOACHIM GALLARDO, a citizen of the Republic of Salvador, Central America, residing at San Tecla, Salvador, have invented new and useful Improvements in Infusion Extractors, of which the following is a specification.

This invention relates to a new and useful apparatus for use in making extractions of coffee, tea, cocoa, and the like substances by means of which considerable economy is effected in that from a given quantity of the substance a much greater quantity of the extract can be obtained than is possible by the methods and apparatus ordinarily in use.

The improved apparatus constructed in accordance with the present improvements comprises a container for receiving the substance, a hollow jacket surrounding a belt of perforations leading through the wall of the container, means for supplying boiling water or steam to said jacket for the purpose of heating and moistening the substance within the container, and means for applying direct pressure to the moist and hot substance. By the use of such improved apparatus, a much more efficient and more rapid treatment of the substance is obtained than is possible by other known means.

In order that the nature of the invention may be more clearly understood, reference will now be made to the accompanying drawing which illustrates partly in front elevation and partly in section a preferred form of apparatus constructed according to the invention.

Referring to the drawing, the improved apparatus comprises a receptacle 1 into which the coffee, tea, etc. 2 is placed, said receptacle being provided with a perforated bottom 3 and means whereby boiling water or steam (or both) may be admitted to the interior thereof. Slidably fitted within the container 1 is a pressure-device constituted by a ram 4 which is utilized to apply direct pressure upon the moist and hot substance within the container 1 so as to extract therefrom the essence or essences and the essential oils more thoroughly than is possible by the ordinary treatment with boiling water or steam.

In the illustrated embodiment of the improved apparatus, a circular base 5 is supported on suitable legs 6 and carries a pair of strong uprights 7 which are connected at their upper ends by a suitable cross-beam 7'. The centre of this beam is provided with an internally threaded boss 8 through which passes a screw 9 the upper end of which is fitted with a suitable operating-handle 10. The lower end of the screw 9 carries the ram 4 which is adapted to be a sliding fit within the container 1 and constitutes the pressure element hereinbefore referred to.

The screw 9 also passes loosely through a cover or lid 11 adapted to fit over the upper end of the container, said cover being tightly locked in position by means of a pair of dogs 12 pivoted to the framing 7 and adapted to be swung into jamming engagement with the cover 11 of the container. In the construction illustrated, the cover is formed with a flange 13 against which the lower ends of the dogs 12 are adapted to bear.

The means for admitting steam or boiling water (or both) to the interior of the container 1 consists of a narrow jacket 14 encircling the container and secured thereto in a fluid-tight manner, said jacket being arranged over a belt of perforations 15 disposed around the container. A coupling 16 is provided between this jacket and a supply-pipe 17, a suitable cock 18 being provided for controlling the supply of the hot fluid.

In order to prevent leakage through the opening in the cover 11, a suitable packing-gland 19 is fitted under the rim 20 of the cover against which the upper surface of the ram 4 is adapted to bear forcibly when in the raised position, thus rendering the container fluid or vapour tight when desired.

The perforated bottom of the container is constituted by a very fine mesh screen or sieve 3 fitted in position in a detachable manner as my means of a spring-ring 3'.

The lower rim of the container is adapted to fit over a strong perforated plate 21 which in turn rests upon the upper part of a funnel-shaped member 22 forming the delivery element of the apparatus. The delivery-pipe 23 is fitted with a suitable tap 24 and is attached to the lower end of the member 22 by means of a coupling 25.

In some cases, particularly with large plant required to operate on substances in bulk quantity, power-operated means could be utilized for actuating the ram. Likewise it is immaterial to the action of the improved apparatus whether the coffee, etc., be placed directly within the container 1 or enclosed in a bag of muslin or like material which may be lifted bodily out of the container when the extraction process is completed.

I claim:

1. An improved apparatus for use in making extractions of coffee, tea, cocoa, and like substances, comprising a container for receiving the substance, a hollow jacket surrounding said container, a belt of perforations encircling the wall of the container and enclosed by the jacket, means for supplying boiling water or steam to said jacket, and means for applying direct pressure to the moist and hot substance within the container.

2. An improved apparatus for use in making extractions of coffee, tea, cocoa, and like substances, comprising a container for receiving the substance, a removable cover adapted to be clamped into tight engagement with the container by means of pivoted dogs, perforations through the wall of the container, a hollow jacket surrounding the container and enclosing the perforations, means for supplying boiling water or steam to said jacket, a pressure-ram movable within the container, and means for drawing off the extraction through the perforated bottom of the container.

3. An improved apparatus for use in making extractions of coffee, tea, cocoa, and like substances, comprising a container for receiving the substance, a removable cover, pivoted dogs for jamming said cover into engagement with the container, a packing-gland within the rim of said cover, a ram movable within the container and adapted to be raised into fluid-tight engagement with said packing-gland, and a fluid-supply jacket enclosing a belt of perforations disposed around the wall of the container.

Dated this 6th day of August, 1924.

J. J. GALLARDO.

Witnesses:
 HERBERT J. W. WILDBOLE,
 HERBERT J. PLANT.